United States Patent [19]

Reese et al.

[11] 4,290,796
[45] Sep. 22, 1981

[54] MOLD ALIGNMENT MEANS FOR GLASS SHEET SHAPING APPARATUS

[75] Inventors: Thomas J. Reese, Sarver; Joseph J. Fisher, Oakmont, both of Pa.

[73] Assignee: PPG Industries, Inc., Pittsburgh, Pa.

[21] Appl. No.: 90,943

[22] Filed: Nov. 2, 1979

[51] Int. Cl.³ .............................................. C03B 23/03
[52] U.S. Cl. ....................................... 65/287; 65/106; 65/273
[58] Field of Search ................. 65/106, 107, 273, 268, 65/287

[56] References Cited

U.S. PATENT DOCUMENTS

| | | | |
|---|---|---|---|
| 2,131,873 | 10/1938 | Goodwillie | 65/273 |
| 2,442,242 | 5/1948 | Lewis | 65/273 |
| 2,570,309 | 10/1951 | Black | 65/273 |
| 3,068,672 | 12/1962 | Black | 65/268 |
| 3,208,839 | 9/1965 | Nordberg | 65/24 |
| 3,251,672 | 5/1966 | Touvay et al. | 65/291 |
| 3,329,494 | 7/1967 | Carson et al. | 65/106 X |
| 3,408,173 | 10/1968 | Leflet | 65/104 |
| 3,453,161 | 7/1969 | Golightly | 156/102 |
| 3,476,540 | 11/1969 | Ritter et al. | 65/107 |
| 3,554,724 | 1/1971 | Ritter et al. | 65/287 X |
| 3,701,643 | 10/1972 | Frank | 65/62 |
| 3,778,244 | 12/1973 | Nedelec et al. | 65/106 |
| 4,187,095 | 2/1980 | Frank | 65/106 X |

Primary Examiner—Arthur D. Kellogg

Attorney, Agent, or Firm—Donald Carl Lepiane; Edward I. Mates

[57] ABSTRACT

Apparatus for shaping glass sheets to a complicated shape including a longitudinal component of bend and a complicated transverse component of bend within a tunnel-like lehr. An outline mold with guides for aligning one or more glass sheets for proper orientation and alignment thereon supports the glass while the glass is bent by gravity sagging to provide a longitudinal component of bend and to deliver the sag bent glass to a position between upper and lower pressing molds having complementary shaping surfaces conforming to a complicated bend including a complicated transverse bend component. Special alignment means are provided to orient and align the outline mold relative to said pressing molds so that the lower pressing mold can lift the sag bent glass off the outline mold into engagement with the upper pressing mold to impress the transverse bend component and return the glass with its complicated shape to the outline mold for controlled cooling and removal from the lehr. When two glass sheets are shaped simultaneously in this manner, they conform exactly to the shape of each other so closely that they can be laminated readily to form a laminated windshield of complicated shape for installation in exact registration with a shaped mounting frame of a vehicle.

The upper pressing mold may be omitted in cases where thin glass sheets are bent to relatively shallow curvatures which may involve complicated shapes and/or outlines.

14 Claims, 12 Drawing Figures

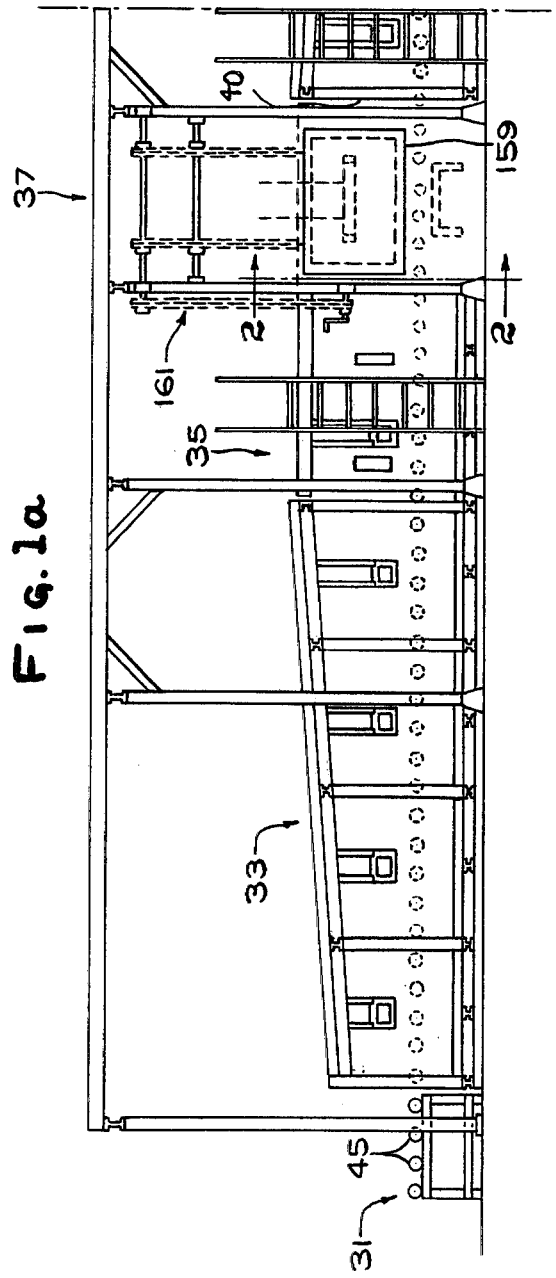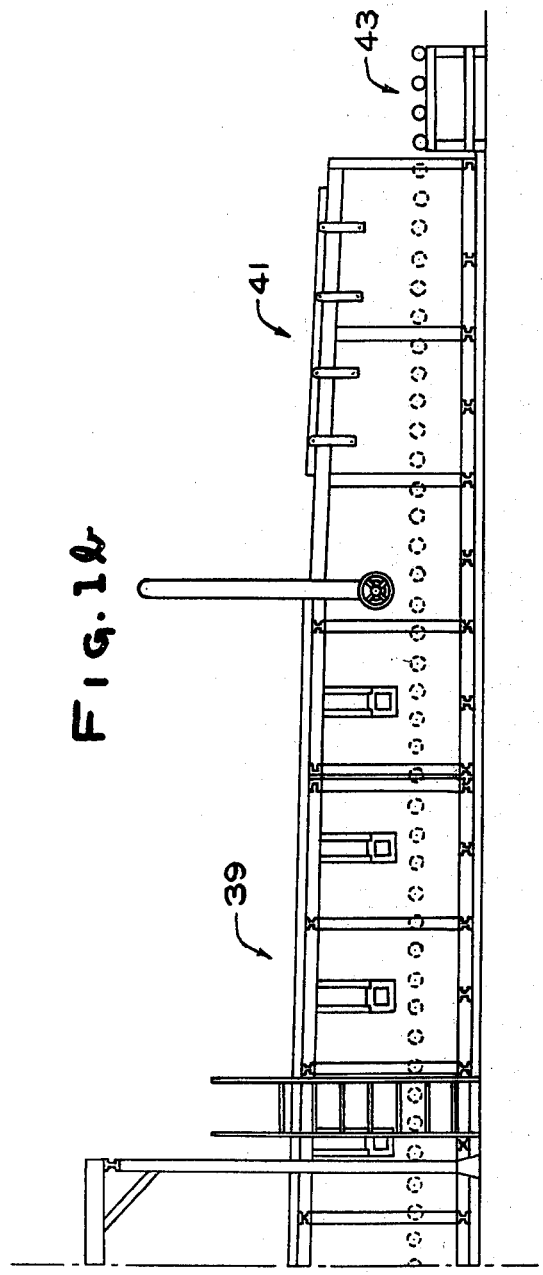

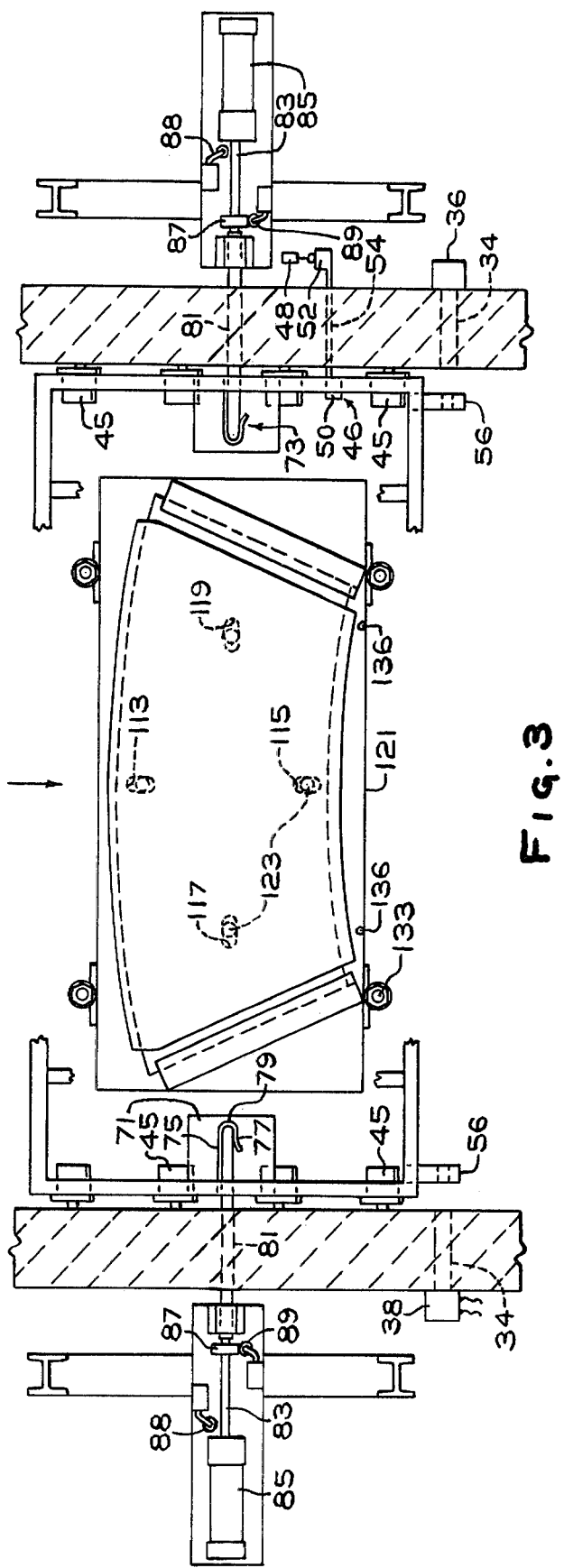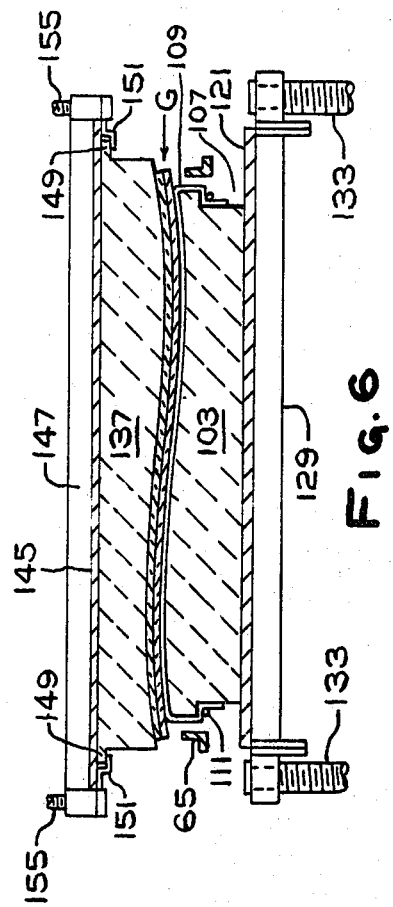

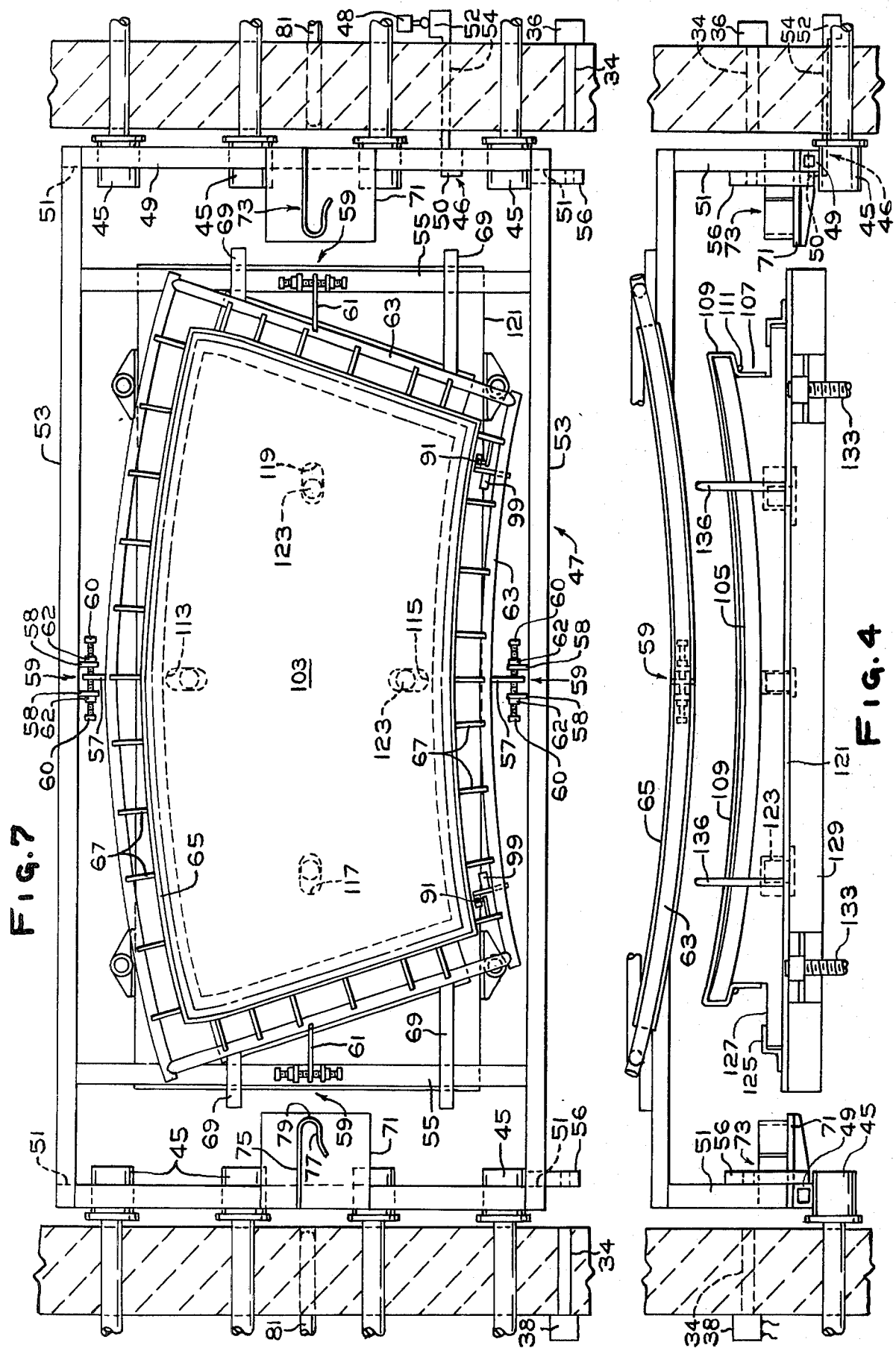

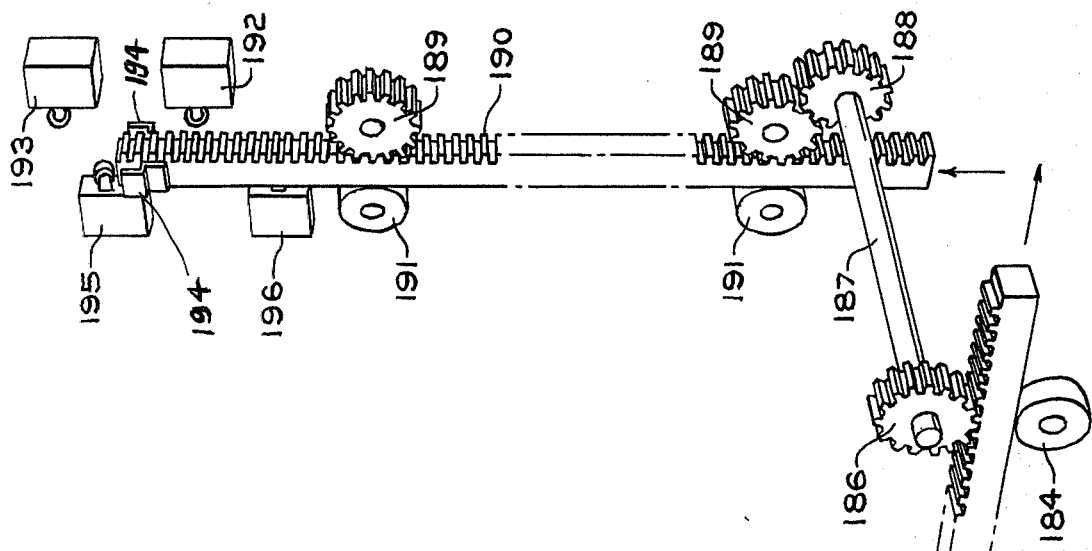
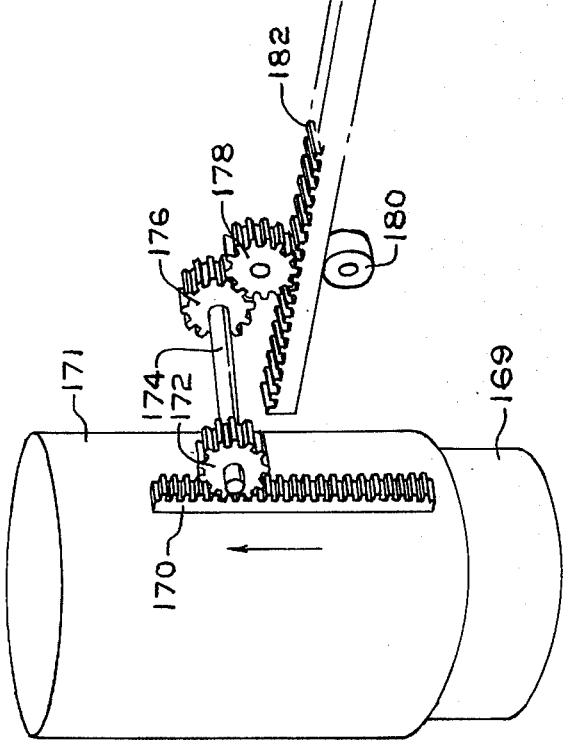
Fig. 11

MOLD ALIGNMENT MEANS FOR GLASS SHEET SHAPING APPARATUS

RELATION TO OTHER APPLICATIONS

The present invention is closely related to several other inventions incorporated in a method and apparatus especially developed to produce laminated windshields for automobiles. These windshields comprise a pair of glass sheets of complementary shape and similar outline of non-uniform shape comprising a longitudinal component of bend and a complicated transverse component of bend. Several copending patent applications cover the various inventions incorporated in said method and apparatus. These patent applications include:

(1) U.S. Pat. application Ser. No. 90,943 of Joseph J. Fisher and Thomas J. Reese for MOLD ALIGNMENT MEANS FOR GLASS SHEET SHAPING APPARATUS, filed Nov. 2, 1979 (the present application);

(2) U.S. Pat. application Ser. No. 90,819 of Thomas J. Reese and Dean L. Thomas for METHOD OF BENDING GLASS SHEETS IN UNISON TO COMPLICATED SHAPES, filed Nov. 2, 1979;

(3) U.S. Pat. application Ser. No. 91,002 of Thomas J. Reese for ALIGNING GLASS SHEETS ON AN OUTLINE MOLD PRIOR TO TRANSFER TO SHAPING MOLD, filed Nov. 2, 1979;

(4) U.S. Pat. application Ser. No. 91,001 of Thomas J. Reese and Edward R. Rodgers for ATTACHING FLEXIBLE COVER TO MOLD FOR SHAPING GLASS, filed Nov. 2, 1979; and (5) U.S. Pat. application Ser. No. 90,944 of Thomas J. Reese and Joseph J. Fisher for USE OF SPEED CHANGES DURING CYCLING OF A SHAPING MOLD, filed Nov. 2, 1979.

BACKGROUND OF THE INVENTION

1. Field of the Invention

This invention relates to the shaping of glass sheets to be laminated, and, in particular, relates to the simultaneous shaping of a pair of glass sheets having a non-rectangular outline of non-uniform curvature in plan by a combination of gravity sag bending and press bending to a complicated shape including a longitudinal bend about a transverse axis of curvature and a complicated bend containing both convex and concave elements in elevation about a longitudinal axis. The bending to such complicated shapes requires that the glass sheets be supported in precise alignment with each of the molds used to impart the different components of the complicated bend to which the glass sheets are to be shaped. Such complicated shapes are required to enable the shaped glass sheets to be mounted in a curved mounting frame forming part of an automobile body so that the curved glass forms a laminated window that merges with the shape of the curved mounting frame and the vehicle body in which it is mounted.

2. Description of Patents of Interest

U.S. Pat. No. 2,131,873 to Goodwillie sag bends a glass sheet to an upward facing shaping surface of a mold of solid continuous extent mounted on a car that moves on wheels riding on fixed rails through a furnace and then stops in alignment below a press bending mold of complementary shape. No specific means is shown to insure proper mold alignment for press bending even though the desirability of proper alignment is mentioned. Hence, this apparatus is limited to shaping glass sheets to simple bends, such as cylindrical or spherical bends, where some misalignment can be tolerated, because of the uniform curvature of the bent sheets.

U.S. Pat. No. 2,442,242 to Lewis discloses apparatus for bending rectangular glass sheets to a cylindrical curvature. The sheets have a straight leading edge that abuts a rib to align a sheet between a pair of heated pressing molds. Fingers that support the sheet during its entry into a position between the pressing molds are retracted from between the pressing molds so that the glass sheet sags toward the lower pressing mold and its shape is completed by pressure between the molds. Only glass sheets having straight leading edges can be aligned between the pressing molds in this patent.

U.S. Pat. No. 2,570,309 to Black sag bends a single glass sheet to conform to the contour of a circular metal outline mold, then lifts the sag bent glass sheet on a concave pressing mold toward an upper convex pressing mold of complementary shape to complete the bending. The press bent glass sheet is lowered to the circular outline mold for transfer to a cooling station. No alignment means is provided to insure that the circular outline mold stops in proper alignment between the pressing molds. Hence, the apparatus of the Black patent is practical only for fabricating glass sheets of circular outline to shapes where misalignment does not result in failure to be able to match the shape of the glass sheet with that of the frame in which the bent glass is to be installed.

U.S. Pat. No. 3,068,672 to Black discloses a sectionalized outline metal mold for bending a glass sheet of non-rectangular outline to a non-uniform shape about a transverse axis of bending by gravity sagging. Stops are provided to guide the location of the glass sheet in proper orientation and alignment relative to the mold. The stops remain in place when the bent glass is removed from the mold. No means is provided to correct the uncontrolled sag in the unsupported region of the shaped glass sheet.

U.S. Pat. No. 3,208,839 to Nordberg press bends glass sheets using a parting agent of colloidal alumina or colloidal silica on the press face to facilitate removal of the bent glass sheet from the mold faces. Only press bending is used to shape the glass.

U.S. Pat. No. 3,251,672 to Touvay et al suggests press bending two tong-suspended glass sheets simultaneously before lamination. No means is provided to avoid tong marks in the glass sheets so treated.

U.S. Pat. No. 3,408,173 to Leflet discloses bending and tempering a glass sheet while supported on an outline mold shaped to have upwardly directed shaping surfaces curved convexly in elevation in one direction and curved concavely in elevation in another direction to impart a complicated shape to a glass sheet so that it is curved convexly in elevation in its longitudinal dimension and curved concavely in elevation in its transverse dimension. No press bending is suggested to minimize uncontrolled sag bending in the unsupported glass sheet area within the mold outline.

U.S. Pat. No. 3,453,161 to Golightly discloses bending at least two glass sheets simultaneously on an outline metal mold of skeleton configuration to bend glass sheets for subsequent lamination in pairs. No press bending to minimize uncontrolled sag is suggested in this patent.

U.S. Pat. No. 3,476,540 to Ritter, Carson and Hymore shapes individual glass sheets conveyed on rollers to a shaping station where each sheet in turn is lifted sufficiently rapidly by an outline mold consisting of a plurality of shaped bars to shape the glass by a so-called inertia gravity bending method.

U.S. Pat. No. 3,554,724 to Ritter and Hymore combines the inertia gravity bending method of the previous patent with peripheral engagement against a supplemental shaping surface constructed and arranged to be contacted by the upper surface of the glass sheet when the latter is lifted. Neither of these last two patents contain any provision for correcting unwanted sag within the supported margin.

U.S. Pat. No. 3,701,643 to Frank discloses apparatus to orient and align moving glass sheets by engaging their opposite side edges. The glass sheets ride over conveyor rolls and their lower major surfaces mar on sliding against the rolls and edge distortion may occur when moving alignment members engage the glass edges.

U.S. Pat. No. 3,778,244 to Nedelec bends glass sheets in a series of pneumatic steps or a combination of a pneumatic step followed by a mechanical step. The patent states that the invention allows to bend two sheets together instead of one on the same apparatus without having to change any step of the process even when the sheets have to be sharply bent. However, no specific way is disclosed in this patent how two sheets can be handled simultaneously by pneumatic handling. Only one sheet may be held by a single suction device.

SUMMARY OF THE INVENTION

The present invention is one of several inventions incorporated in novel apparatus for shaping a pair of glass sheets of non-rectangular outline and of non-uniform curvature in plan simultaneously to a complicated shape comprising a longitudinal component of bend about a transverse axis of bending combined with a transverse component of bend, such as one of generally S-shaped configuration containing both convex and concave elements in elevation about a longitudinal axis of bending or other complicated shapes. Initially, the glass sheets are mounted as a pair in proper alignment and orientation on an outline metal mold for sag bending to a longitudinal component of bend about their transverse axes.

Glass edge abutment members of a special construction and arrangement are provided to insure proper alignment of the glass on the outline mold. These abutment members remain in glass edge abutment while the glass sags by gravity toward the outline mold and are removed from glass edge contacting positions just before the glass is removed from the outline mold.

The outline mold is supported on a carriage that moves in a hot atmosphere along a stub roll conveyor that allows thermal expansion without warpage of the outline mold and the carriage. The mold stops in approximate alignment between a solid lower pressing mold and an upper mold having complementary shaping surfaces defining the longitudinal component of bend combined with the transverse component of bend of generally S-shaped configuration. Means is provided to align and orient the outline mold exactly between the pressing molds.

The lower pressing mold has an outline similar to but slightly smaller than that of the outline mold so that the pair of longitudinally bent glass sheets is lifted by engagement over substantially their entire under surface on the lower pressing mold by moving the lower pressing mold through the outline mold into pressing engagement with the downwardly facing surface of the upper pressing mold. This latter engagement lasts for the shortest time possible that is needed to impress the transverse shape onto both glass sheets simultaneously and to bend the glass sheets into complicated conforming shapes. The lower pressing mold lowers to replace the bent pair of glass sheets onto the outline mold as rapidly as possible with the glass edge abutment members out of the way.

A particular speed cycle is provided to lift and lower the lower pressing mold to minimize the duration of the shaping cycle and to minimize the chance of misaligning the glass relative to the outline mold during transfer of the glass from the outline mold to the lower pressing mold and its return to the outline mold. This speed cycle includes a rapid initial lifting speed and final lowering speed of the lower pressing mold while it is out of contact with the glass and a lower speed of lifting and lowering when the lower pressing mold contacts and supports the glass.

Apparatus conforming to a preferred embodiment for performing this invention includes an optical inspection system such as a laser detection system or the like that operates in cooperation with a pair of apertured plates on the mold support carriage to control a master switch that permits the lower pressing mold to move upward only when the laser beam passes through the apertures of both plates. This safety feature protects the lower pressing mold and the outline mold from damage that may result from a collision between the two molds when the outline mold is positioned incorrectly at the press bending station.

The outline mold conveys the pair of bent glass sheets through an annealing lehr where they are cooled at a controlled rate of cooling to below the strain point to insure that the glass sheets retain their complicated conforming shapes, and then are further cooled to handling temperature. The pair of bent glass sheets is then ready for assembly and lamination. Unless the glass sheets are precisely aligned in their conforming complicated shapes, it becomes difficult to laminate the sheets of complicated shape and outline and difficult to install the resulting bent laminated window in a mounting frame of complementary curvature and outline because the shape imparted to the glass sheets is misaligned from the desired configuration.

The present invention is mainly concerned with aligning glass sheets of non-uniform outline in proper orientation and alignment on the outline mold, aligning the outline mold properly with respect to the mold supporting carriage in such a manner that both the outline mold and the carriage can expand thermally without inducing warpage or relative misalignment therebetween, orienting and aligning the outline mold relative to the lower pressing mold at the proper moment in the bending cycle and correlating the various mold movements to avoid a collision between the lower pressing mold and the outline mold that could damage the molds.

The present invention will be understood more clearly in the light of a description of a preferred embodiment that follows. While the specific embodiment of the invention described in this specification relates to shaping a pair of glass sheets simultaneously to a complicated bend that includes a longitudinal bend component combined with a transverse bend component of S-shaped configuration in elevation, it is understood that the present invention may also be used to simultaneously shape one or more glass sheets to complicated curvatures having a transverse bend component other than that of an S-shaped configuration combined with a longitudinal component of bend of any desired configuration. The present invention is also suitable for shaping glass sheets to shapes that involve one or more simpler bends of non-uniform or uniform curvature where it is essential to fit bent sheets having irregular outlines to shaped frames of corresponding configuration.

BRIEF DESCRIPTION OF THE DRAWINGS

In the drawings that form part of a description of a preferred embodiment for accomplishing the present invention and where like reference numbers refer to like structural elements;

FIG. 1, comprising FIG. 1a and FIG. 1b, is a longitudinal side view of apparatus modified in accordance with said embodiment, FIG. 1a showing the upstream portion of said apparatus and FIG. 1b showing the downstream portion of said apparatus, with certain parts omitted to show other parts more clearly;

FIG. 3 is a fragmentary plan view of the end portion of a support carriage for an outline mold used in the present apparatus, with the central portion of the outline mold omitted to show certain details of an alignment and support structure for the lower pressing mold and also showing in plan view alignment means included in said apparatus;

FIG. 4 is an enlarged, fragmentary elevational view of portions of the lower pressing mold and of the outline mold with the lower pressing mold depicted in its lowered position;

FIG. 6 is a fragmentary view similar to a portion of FIG. 5, showing the lower pressing mold lifting the glass sheets to a position of engagement with the upper pressing mold to impress a shape about an axis transverse to said longitudinal component of bend;

FIG. 7 is a fragmentary plan view of the outline mold, its supporting carriage and alignment means shown aligned over the lower pressing mold with alignment pins retracted;

FIG. 11 is a schematic, perspective view of a system of tripping limit switches that control various operations of apparatus used in the preferred embodiment.

DESCRIPTION OF PREFERRED EMBODIMENT

Figure 2:
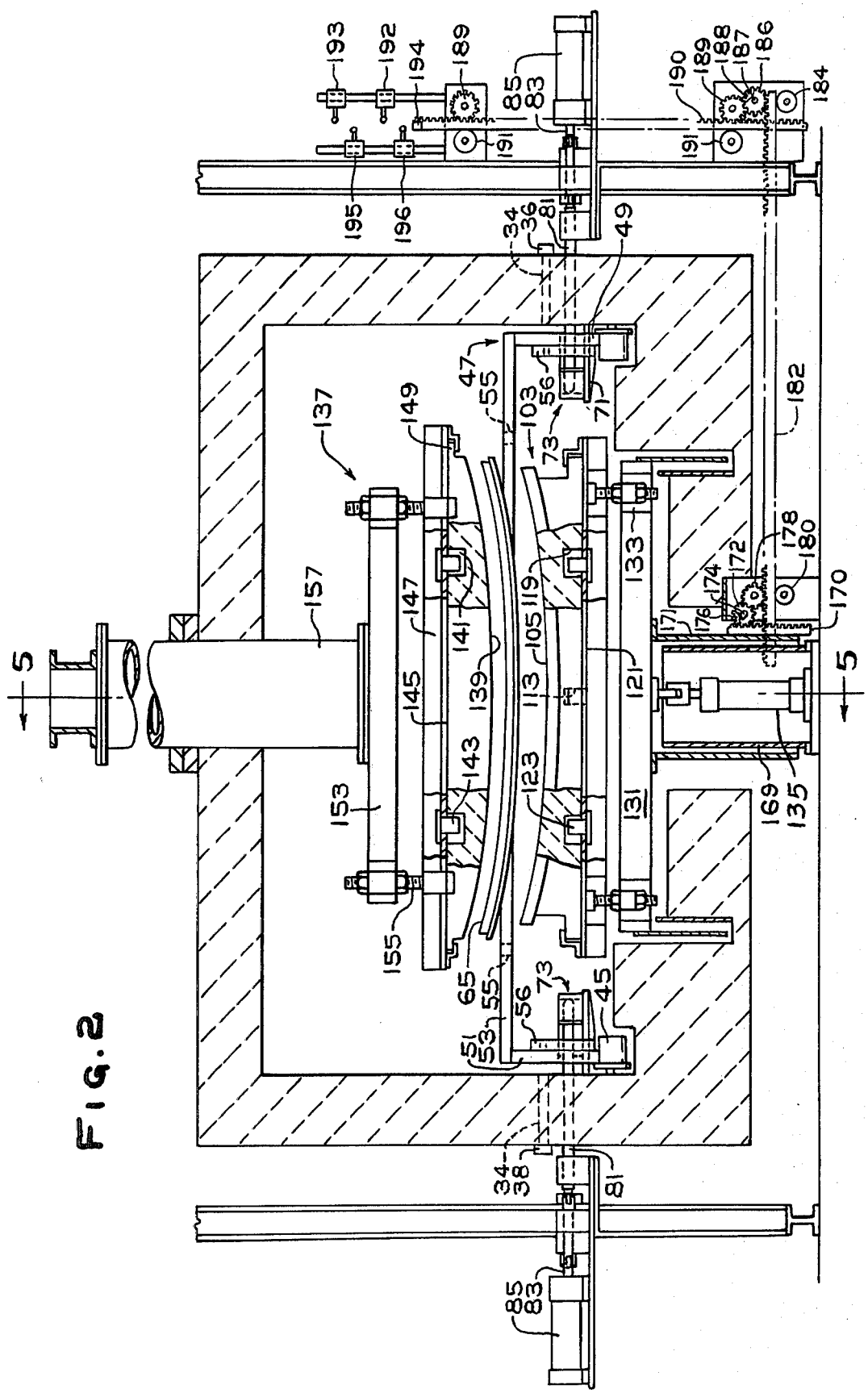
FIG. 2 is a transverse view taken along the line 2—2 of FIG. 1, showing a transverse elevation of a press bending station incorporated in said apparatus embodiment, with certain parts removed to show other parts in section.

A description of a preferred embodiment of apparatus for performing the present invention read in conjunction with the drawings should enable the reader to understand this invention more clearly.

In the drawings, FIGS. 1a and 1b depict a heating, shaping and annealing lehr for shaping glass sheets according to the present invention. The lehr begins downstream of a loading zone 31 and includes a heating zone 33 of tunnel-type configuration, a gravity bending zone 35 downstream of the heating zone, a press bending or shaping station 37 immediately beyond the gravity bending zone 35, an annealing zone 39 including a door 40 beyond the shaping station 37, and a cooling zone 41 in end to end relation in the downstream portion of the lehr. An unloading zone 43 is beyond the lehr.

Shown in FIG. 4, the opposite side walls of the lehr at the shaping station 37 are provided with aligned tubes 34 forming part of an optical inspection system. Tubes 34 are aligned between a laser transmitting device 36 or other radiant energy transmitter attached to one side wall and a laser receiving device in the form of a photoelectric cell 38 or the like attached to the opposite side wall in position to detect a laser beam from said transmitting device 36.

Referring back to FIG. 1, a conveyor comprising a plurality of stub rolls 45 disposed in transversely opposing, longitudinally spaced relation extends the entire length of the lehr and defines a path of movement along a longitudinal reference line. Each stub roll 45 is mounted on a shaft that extends through a side wall of the lehr and is connected to a conveyor drive means (not shown). A mold return conveyor (not shown) extends above the entire lehr. The conveyor may be divided into a number of sections, each driven from its own drive means through conventional drive rod and gear means or chain drives or the conveyor sections may be driven from a common drive through clutches in any manner well known in the art. The longitudinal reference line is preferably the longitudinal center line of the conveyor and the lehr, but may be one that is parallel thereto.

Shown in FIGS. 3, 4 and 7 is a rotatable trip 46 for actuating a limit switch 48 is located between adjacent stub rolls 45 in the press bending station 37. The trip 46 comprises a small inner tab 50 and a large outer tab 52 rigidly mounted on a pivot rod 54 that extends through a side wall of the press bending station.

A plurality of mold support carriages 47 (one only shown in FIGS. 2 and 7) each comprising a pair of stub-roll supported rails 49 that extend transversely at each end of the carriage 47 is conveyed along the conveyor by rotational engagement of the stub rolls 45 with the rails 49. One of the rails 49 moves along a path to engage the rotatable trip 46. Normally, the large outer tab 52 causes the pivot rod 54 to rotate into a position where the small inner tab 50 is oriented vertically upward and the large outer tab 52 oriented vertically downward out of engagement with the limit switch 48. The latter is located on the outside surface of the side wall of the lehr for ease of access.

Referring also to FIG. 4, when carriage rail 49 engages the trip 46, it causes the small inner tab 50 to rotate to a horizontal orientation in the downstream direction of movement of the carriage 47 so that the large outer tab 52 rotates into a horizontal orientation in the upstream direction to actuate the limit switch 48. The latter remains engaged until carriage rail 49 passes beyond the position occupied by the small inner tab 50. At this time, the large outer tab 52 rotates into a vertically downward orientation to raise the small inner tab 50 into position for engagement by a rail 49 of the next carriage 47.

Uprights 51 connect the rails 49 to a pair of upper horizontal longitudinal rails 53. A pair of upper transverse rails 55 interconnect the upper horizontal longitudinal rails 53 of the carriage 47.

Each upright 51 along one longitudinal side edge of the carriage 47 is provided with an apertured plate 56. The apertures in the plates 56 are arranged to be aligned between the laser transmitting device 36 and the laser receiving device 38 whenever the carriage 47 is oriented, aligned and positioned correctly within the press bending station 37.

As shown in FIG. 7, a finger 57 extending longitudinally of the longitudinal reference line is adjustably mounted longitudinally of each upper horizontal longitudinal rail 53 through position adjustment means 59. Each means includes a pair of finger-like brackets 58 fixed to each rail 53, each bracket adapted to receive a set screw 60. The inner ends of the set screws engage the opposite surfaces of finger 57 to adjust the position of the latter relative to the length of rail 53. Lock nuts 62 lock the set screws against the brackets to lock the position of finger 57. Horizontally extending fingers 61 that extend transversely of the longitudinal reference line are similarly adjustably attached relative to the upper transverse rails 55. Four position alignment means 59 are shown, one for each rail 53 and 55 to comprise outline mold alignment means.

The inner end of each finger 57 is rigidly secured to a longitudinally extending portion and the inner end of each finger 61 is rigidly fixed to a connecting end portion of an outline reinforcing ring 63, which surrounds an outline shaping mold 65. The latter is a ring-like member that conforms in elevation and outline to the longitudinal and transverse elevational shape desired for glass sheets to be bent but is slightly smaller than the glass sheet outline to permit the edge of the glass sheet to extend slightly therebeyond. A plurality of connectors 67 interconnect the outer surface of the outline mold 65 and the outline reinforcing ring 63. A pair of longitudinal bars 69 is attached to the connecting end portions of the outline reinforcing ring 63. The longitudinally outer ends of the bars 69 rest on the upper transverse rails 55 adjacent to the attached end portion.

Each of the four position adjusting means 59 is adjusted and locked into position so that the geometric center of the outline mold 65 is located at the intersection of a line connecting longitudinally extending fingers 57 with a line connecting transversely extending fingers 61. Fingers 57 and 61 are provided with a sliding fit between set screws 60 to allow different thermal expansion without displacing the geometric center of the outline mold 65 while avoiding distorting the outline mold in either plan outline or elevation.

Referring now to FIG. 3, each rail 49 supports a small horizontal platform 71 on which is mounted a J-shaped wall member 73. The latter has a long leg 75, a short leg 77 and a connecting closed end 79. The legs 75 and 77 extend transversely of the length of the longitudinal reference line. The closed end 79 is at the transversely inner end of the J-shaped wall member 73 and is adapted to be engaged by a pin 81 at the end of a piston rod 83. The latter extends from a piston cylinder 85 carried by a housing mounted on the lehr support structure. The piston rod 83 has an enlarged head 87 adapted to engage limit switches 88 and 89 during movement thereof. The J-shaped wall members 73 serve as pin engaging members.

Figure 8:
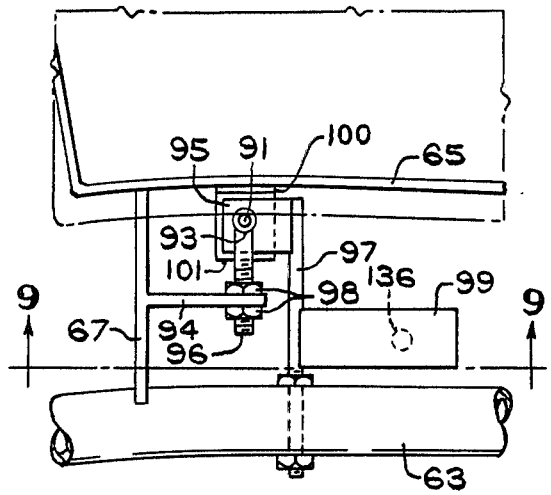
FIG. 8 is a fragmentary plan view of a portion of the outline mold containing a movable glass sheet edge alignment means.
Figure 9:
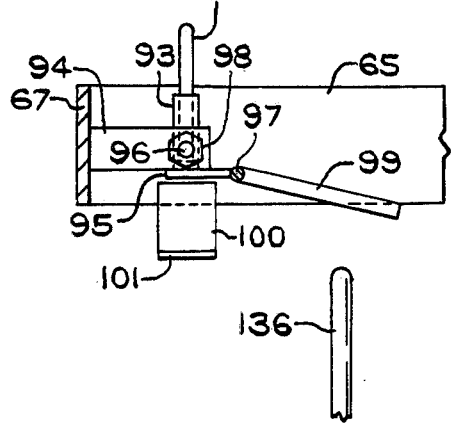
FIG. 9 is a view taken along the line 9—9 of FIG. 8, showing the movable glass sheet edge alignment means in its raised position to define the location of the edge of glass sheets when the latter are mounted on the outline mold.
Figure 10:
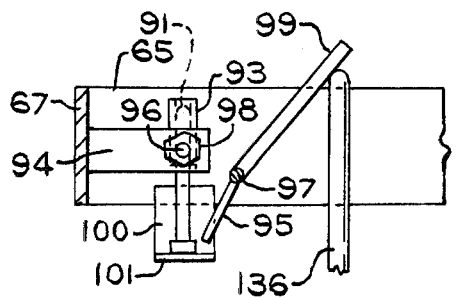
FIG. 10 is a view similar to that of FIG. 9, showing the retracted position of the movable glass sheet edge alignment means after it has been actuated by an actuation pin fixed in position for movement with the lower pressing mold.

Referring to FIGS. 8, 9 and 10, each outline mold 65 is also provided with glass sheet alignment means comprising guides, each in the form of an alignment pin 91 slidable in a vertical sleeve 93. The latter is adjustably attached to a connector 67 through an apertured finger 94 and an axially adjustable threaded shaft 96 fixed to sleeve 93 at one end and locked by lock nuts 98 to the apertured finger 94. The bottom end of each alignment pin 91 is adapted to rest on an extension tab 95 extending radially outward from a horizontal pivot pin 97 extending inward from reinforcing ring 63. A wider and heavier extension tab 99 extends radially from the horizontal pivot pin 97 in a direction opposite the extension tab 95 to bias the extension tab 95 upward to temporarily support the alignment pin 91. An angle member 100 provided with a horizontal flange 101 is fixed to the outline mold 65 directly below the sleeve 93 and sufficiently below the horizontal pivot pin 97 to allow extension tab 95 to clear flange 101. The alignment pins 91 provide guide means for abutting the edge of a pair of glass sheets when the latter are mounted on the outline mold 64 for shaping at the loading zone 31. This abutment helps register the geometric center of the supported glass with that of outline mold 65. The glass edge remains in abutment with the alignment pins 91 during passage of the outline mold 65 from the loading zone 31 to the shaping station 37 until the alignment pins 91 are lowered just before the glass is removed from the outline mold 65.

Returning to FIG. 2, the press bending station 37 comprises a lower pressing mold 103 that includes an upper ceramic press face 105, whose upper surface covers a continuous area whose outline is slightly smaller than the outline mold, defines a shape that is concave in elevation across the width of the lehr to conform to the longitudinal component of bend and is S-shaped in elevation in the direction of the length of the lehr to conform to a desired transverse component of bend.

Figure 5:
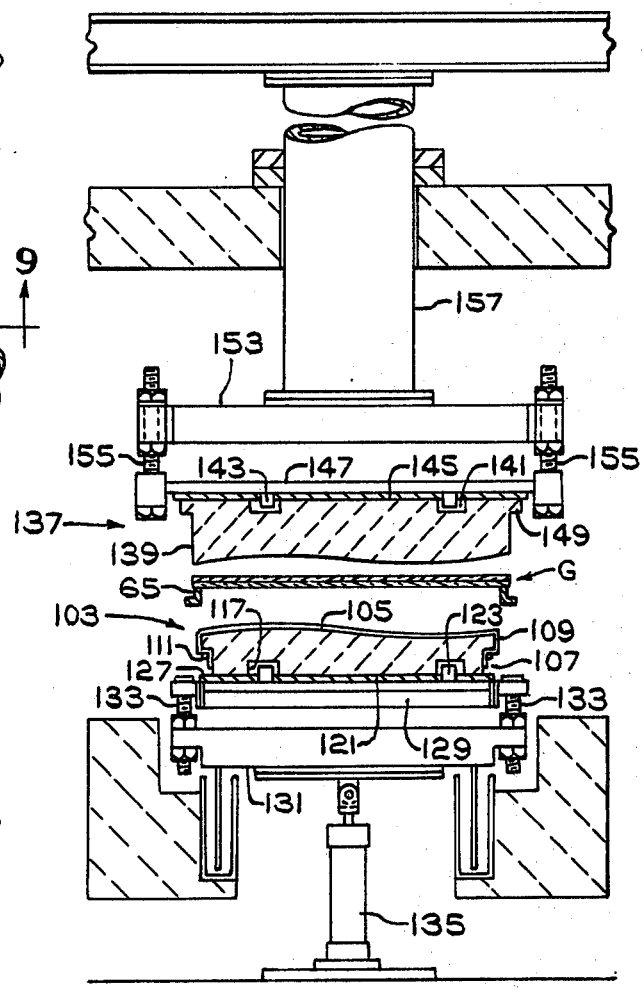
FIG. 5 is a sectional view of the upper and lower pressing molds and outline mold taken along the line 5—5 of FIG. 2 with parts omitted to show other parts more clearly; and showing the relative positions of the molds when the pressing molds are separated at the time of arrival of an outline mold carrying a pair of glass sheets bent to a longitudinal component of bend.

The ceramic press face 105 is provided with a peripherally extending undercut portion 107 that receives the end of a mold cover 109 of a flexible fabric material that does not mar a hot glass sheet such as fiber glass cloth and fine wire mesh. Preferably, two layers of knit fiber glass cloth of the type covered in U.S. Pat. No. 3,148,968 to Cypher and Valchar is used. A wire 111 is wrapped around the undercut portion 107 over the folded end portion of the mold cover 109. If needed, wire 111 is secured to the undercut portion where it is shaped concavely in plan. The ends of the wire are twisted to tighten the mold cover 109 against the undercut portion to insure that the cover 109 fits tightly against the press face 105 as shown in FIG. 5. In this manner, the cover tightening means in the form of the wire 111 does not extend beyond the outline of the press face 105.

The lower portion of the ceramic press face 105 is provided with a pair of elongated slots 113 and 115 extending longitudinally of said longitudinal reference line (FIGS. 3 and 7) and a pair of elongated slots 117 and 119 extending along a transverse reference line. The slots 113, 115, 117 and 119 are so arranged that the longitudinal reference line connecting elongated slots 113 and 115 intersects the transverse reference line connecting slots 117 and 119 at the geometric center of the plan outline of the ceramic press face 105. This geometric center is located in a fixed vertical axis that intersects the geometric center of the press bending station 37 and of press face 105. Adjustment of the positions of fingers 57 and 61 is made to align the geometric center of the outline mold 65 with said fixed vertical axis when said outline mold occupies an operating position at the press bending station 37.

Referring also to FIG. 4, the ceramic press face 105 rests on a metal plate 121 to which are secured upright pins 123, one for each slot 113, 115, 117 and 119. The pins 123 are located so that the geometric center of the pins (which corresponds to the geometric center of press face 105) lies along the longitudinal reference line that corresponds to the center line longitudinally of the lehr and along the transverse reference line transverse to the lehr that is common to the pins 81. If desired, Z-bars 125 are provided to secure a lower flange 127 of press face 105 against the metal plate 121 while permitting differential thermal expansion therebetween. Referring to FIG. 5, the arrangement of slots 113, 115, 117 and 119 and upright pins 123 insures that the lower pressing mold 103 has its geometric center in proper position at all times despite any temperature changes from the temperature of installation to the temperature of operation.

The metal plate 121 is reinforced with a grating 129. The latter is connected to a lower frame 131 by vertical adjustment means 133 in the form of adjusting screws, for example. A lower piston 135, which is adapted to move vertically parallel to the fixed vertical axis that intersects the geometric center of the press face 105 of the lower pressing mold 103, is connected to the lower frame 131 to raise and lower the lower pressing mold 103 in a vertical direction to positions controlled by the stroke of the lower piston 135 and the adjustment of the vertical adjustment means 133. When the lower piston 135 moves the lower pressing mold 103, the geometric center of the press face 105 moves along said fixed vertical axis at the geometric center of the press bending station 37.

A pair of actuating pins 136 (FIGS. 3, 4, 9 and 10) extends upward from metal plate 121 in position to engage and lift heavier extension tabs 99 between the outline reinforcing ring 63 and the outline mold 65 when the lower pressing mold 103 is raised. This engagement lowers alignment pins 91 from adjacent the outline mold 65 to enable the glass sheet to be redeposited on the outline mold 65 without fear of its being lowered in sliding engagement against the pins 91.

Referring now to FIGS. 2 and 5, the press bending station also includes an upper pressing mold 137 comprising a lower ceramic press face 139 that defines a downwardly facing shaping surface that is complementary to the upwardly facing shaping surface defined by the ceramic press face 105 of the lower pressing mold 103. The upper pressing mold is supported in a position such that the geometric center of its lower ceramic press face 139 is intersected by the vertical axis of movement for the geometric center of the upper ceramic press face 105 of the lower pressing mold 103 and so that the downwardly facing shaping surface defined by press face 139 is oriented and aligned over the upwardly facing shaping surface defined by press face 105.

A mold cover of a material similar to that provided for the lower pressing mold 103 and also preferably of two layers of knit fiber glass cloth may also be provided for the upper pressing mold 137. The ceramic press face 139 is provided with elongated slots 141 similar to slots 113, 115, 117 and 119 to receive vertical alignment pins 143 attached to a metal plate 145 reinforced by a reinforcement grating 147. The mold cover for the upper pressing mold is suitably clamped to the marginal portion of metal plate 145 that extends beyond the upper press face 139 and stretches around the upper pressing mold 137 and against the downwardly facing shaping surface defined by its press face 139. The slots 141 and pins 143 assure that the upper pressing mold 137 has its geometric center directly over the geometric center of the lower pressing mold 103 and also maintains its orientation aligned with the orientation of the lower pressing mold 103 despite changes in temperature that occur during operation.

Referring also to FIG. 6, the ceramic press face 139 has an upper flange 149 that is supported by Z-bars 151 secured to the under side of metal plate 145 to provide a ledge to support the upper flange 149 while permitting relative horizontal sliding due to differences in thermal expansion.

Referring back to FIGS. 2 and 5, an upper metal frame 153 is adjustably secured to metal plate 145 through vertical alignment means 155 which may be similar in construction to the vertical adjustment means 133. A vertical column 157 supported from an overhead support structure and adjustable by screw jacks (not shown) is used to hold the upper pressing mold 137 in a desired position.

Access to the press bending station 37 is provided by a side door 159 (FIG. 1a). Lifting and lowering means 161 is provided to open and close the side door 159 when access to the press bending station is needed.

Referring to FIGS. 11 and 2, the lower piston 135 is mounted within an inner cylindrical housing 169. A first vertical rack 170 is fixed to an outer wall of an outer cylindrical housing 171. The latter is arranged concentrically of inner housing 169 to move vertically in unison with the vertical movement of the rod within the lower piston 135 to cause the first vertical rack 170 to mesh with and cause to rotate a first gear 172 fixed to a short horizontal drive shaft 174. A second gear 176 also fixed to the short horizontal drive shaft 174 meshes with a third gear 178. A back-up roll 180 is aligned with the third gear 178 on opposite sides of a transversely extending horizontal rack 182 at the inner end portion thereof. The latter extends from below the shaping station 37 through a side wall of the lehr and is supported outside the lehr by a back-up roll 184 at its outer end portion with a fourth gear 186 aligned over the back-up roll 184. The fourth gear 186 is fixed to a shaft 187 (exterior of the lehr) to which a fifth gear 188 is also fixed to rotate therewith. Fifth gear 188 meshes with the lower of a pair of rack driving gears 189 which rotate to lift or lower a second vertical rack 190 with a back-up roll 191 aligned with each rack driving gear 189 on opposite sides of the second vertical rack 190. A limit switch 192 that controls the vertical upward speed of the piston in the lower piston cylinder 135 and a limit switch 193 which controls a timer circuit that holds the lower pressing mold in its upward position for a predetermined time are actuated by upward movement of a tripper 194 carried on one side of the second vertical rack 190. Another tripper 194 on the other side of the rack 190 engages a limit switch 195 that controls a pair of timers that control relatively slow speed lowering of the lower piston 135 followed by faster speed lowering until the other tripper 194 engages a limit switch 196 at the bottom of the stroke of the lower piston 135 to control the lateral retraction of alignment pins 81 from the J-shaped members 73, the opening of door 40 and the rotation of the stub rolls 45 in the conveyor portion that includes the shaping station 37 when the lower piston 135 is fully retracted.

Cycle of Operation

A pair of glass sheets of curved outline with suitable parting material therebetween is mounted in a substantially horizontal orientation on an outline mold 65 supported on a mold supporting carriage 47 at the loading zone 31. The carriage 47 is transversely aligned relative to the longitudinal reference line by approximately exact positioning of rails 49 on stub rolls 45. Alignment pins 91 are lifted to guide the proper location of the marginal edge portion of the glass sheets relative to the outline mold 65. Heavier extension tabs 99 pivot extension tabs 95 in positions to support the pins 91 in their elevated position shown in FIGS. 8 and 9. The carriage passes through the heating zone 33 of the lehr where heating elements are arranged to provide a pattern of heating both longitudinally and transversely of the path of travel for the glass laden mold 65 through the lehr. By the time the mold arrives at the gravity bending zone 35 (maintained at an ambient temperature range of 1150° F.–1180° F. [621° C.–638° C.]), the glass sheets are heated to the deformation temperature of the glass (between 1080° F. [582° C.] and 1150° F. [621° C.]) and sag to the longitudinal component of bent but not the transverse component of bend conforming to the shape defined by the upward facing shaping surface of the outline mold 65. The longitudinal component of bend is about an axis that is essentially parallel to the longitudinal reference line defined by the conveyor extending through the length of the lehr.

During passage of the outline mold 65 from the loading zone 31 to the press bending station 37, it may lose its approximately proper alignment and orientation with respect to the longitudinal reference line. However, because the glass sheets have non-rectangular outlines of non-uniform curvature in plan and are bent to complicated shapes, it is essential that the sheets be oriented and aligned exactly when they arrive at the press bending station 37. It is also important to avoid mold damage that the outline mold 65 be properly aligned above the lower pressing mold 103. The apertured plates 56 mounted on the carriage 47 intercept the laser beam when the carriage is improperly placed or misoriented at the press bending station to stop further operation of the apparatus until the apertures in both apertured plates 56 are in the path of the laser beam.

At this time, lower pressing mold 103 is in a lowered position to provide clearance for the passage of the carriage 47 into the press bending station 37. Also, the pins 81, which were retracted to their outward positions to allow the J-shaped wall members 73 of the previous carriage to pass through the press bending station 37, are actuated when a carriage rail 49 engages trip 46 and rotates inner tab 50 and outer tab 52 in unison to energize limit switch 48. The latter actuates piston cylinders 85 to move pins 81 into intermediate positions where the short legs 77 clear the pins 81 but the long legs 75 engage the pins 81, thereby stopping further movement of the carriage 47. At this time, the geometric center of the glass is aligned with the transverse reference line, but may not be aligned with the longitudinal reference line.

When the pins 81 are in their intermediate positions, enlarged heads 87 engage limit switches 88. The latter arcuate a first timer that stops the rotation of the conveyor rolls 45 at press bending station 37 and a second timer that temporarily stops further inward movement of piston rods 83 and after an adjustable time delay for the rolls to stop rotating, permits the piston rods 83 to move along a line parallel to the transverse reference line to their fully extended positions where enlarged heads 87 engage limit switches 89 and pins 81 abut the connecting laterally inner ends 79 of the J-shaped wall members 73 to center the carriage 47 and its supported outline mold 65 so that the geometric center of the outline mold 65 is aligned vertically with the geometric centers of the upper pressing mold 137 and of the lower pressing mold 103.

Limit switch 89 operates a pair of master switches (not shown) that closes only when the laser beam receiver 38 detects the laser beam. Therefore, the lower pressing mold 103 cannot move upward unless the carriage 47 is properly positioned, aligned and oriented at the press bending station 37.

Limit switch 89 also controls the raising of lower piston 135 to lift the lower pressing mold 103 rapidly until tripper 194 engages limit switch 192, and then at a slower rate of lifting, thereby lifting the glass sheets off the outline mold 65 more slowly and supporting the glass sheets throughout substantially their entire extent during their lifting into engagement with the upper pressing mold 137. As the lower pressing mold rises, actuating pins 136 engage heavier extension tabs 99 to release alignment pins 91 for dropping the latter onto horizontal flanges 101, thereby clearing the vicinity of the margin of the outline mold 65 of any glass edge abutting means before lifting the glass off the outline mold 65.

The pressing molds 103 and 137 are maintained at a desired elevated temperature in the press bending station 37. Elevated mold temperatures enhance the ability of the pressing molds to complete the shaping of the glass and reduce the likelihood of causing chill cracking in the glass, a phenomenon associated with colder molds. The pressing molds are at an elevated temperature that approximates the ambient temperature in the press bending station 37.

Limit switch 193 actuates a timer when piston 135 is fully extended to hold the pressing molds against the opposite outer major surfaces of the pair of glass sheets to insure the imposition of the transverse curvature of S-shaped configuration. The timer also controls the start of the return of the lower pressing mold 103 at a reduced rate of lowering speed to its lowered position. From momentary contact to five seconds engagement is needed to impress the transverse shape depending on its severity of curvature and the glass thickness. When the other tripper 194 engages limit switch 195, piston 135 is accelerated in its downward movement until other tripper 194 engages limit switch 196.

Piston 135 is fully retracted when the other tripper 194 actuates limit switch 196 that retracts pins 81, opens the lehr door 40 and starts another timer (not shown). The fully retracted pins 81 engage additional limit switches (not shown) that cooperate with the last named timer to actuate the running of conveyor rolls 45. The lehr door 40 opens to actuate a limit switch (not shown) near the lehr door 40 that continues the rolls running until such time as the last named timer times out and the lehr door 40 starts to close, thereby disengaging the last named limit switch. A limit switch within the annealing zone 39 actuated by a carriage rail 49 controls the closing of the lehr door 40.

The control circuitry for the next cycle is set when the carriage rail 49 disengages from trip 46 with pins 81 retracted, piston 135 lowered, rolls 45 running and door 40 closed.

It will be appreciated that the lifted alignment pins 91 by abutting the sheet edge retain the sheets in proper alignment with the outline mold 65 during passage of the outline mold 65 and the mold support carriage from the loading zone 31 to the shaping station 37. The outline mold 65 remains in alignment with the carriage 47 during this movement. However, because the carriage rails 49 ride on stub rolls 45, they may slide unequally and cause the carriage 47 to become misoriented and/or misaligned during this passage while permitting the carriage 47 and its supported outline mold 65 to expand thermally without warpage (that might exist if the carriage had wheels that engage rigid tracks) as the carriage moves into successively hotter areas in the heating zone 33. The pins 81 engage the pin engaging members 73 on the carriage to correct any misorientation and misalignment of the outline mold 65 at the shaping station 37. The lower pressing mold 103 does not start to rise until the positioning of the carriage 47 at the shaping station 37 is corrected.

The lower pressing mold 103 rises rapidly initially to reduce the duration of a press bending cycle. However, at about the time that the actuating pins 136 engage the heavier extension tabs 99 to release the alignment pins 91 from their glass edge abutting positions, the lower pressing mold 103 continues to rise at a slower rate to reduce any chance of misaligning the glass sheets from the outline mold 65 during their transfer to the lower pressing mold 103 as the latter continues to move upward through the position occupied by the outline mold 65 into a position where the upper surface of the upper glass sheet engages the upper pressing mold 137 for the minimum time needed for impressing the transverse component of bend. The glass sheets are lowered as rapidly as possible onto the outline mold 65 by lowering the lower pressing mold 103 through the outline mold 65 at a less rapid rate that avoids glass misalignment followed by more rapid lowering to completely below the carriage 47 to complete the operational cycle at the shaping station 37 as quickly as possible. A typical speed cycle for the lower pressing mold 103 is an initial upward velocity of 3.5 inches (8.9 cm) per second before engaging the glass reducing to a lifting velocity of 1.4 inches (3.6 cm) per second after engaging the glass and a lowering speed of 1.4 inches (3.6 cm) per second until the glass is replaced on the outline mold followed by a faster lowering speed of 4.3 inches (10.9 cm) per second.

The alignment pins 91 are kept below the shaping surface of the outline mold 65 during the lifting of and lowering of the glass sheets relative thereto to avoid any edge damage to the glass that results from rubbing the glass edge against the alignment pins 91 during rubbing movement that is more rapid than the relatively slow rate at which the glass sags toward the outline mold 65. The glass redeposited on the outline mold 65 conforms in outline and both longitudinal and transverse elevation to the shape of said outline mold.

The combination of the various apparatus elements and the cooperation of the limit switches and timers insures that glass sheets of complicated outlines are shaped in pairs to complicated shapes by a combination of sag bending over an outline mold to develop a longitudinal component of bend followed by press bending or lifting on a solid mold of continuous extend to develop a complicated transverse component of bend while correcting any uncontrolled sag in the shape developed during the sag bending with limited time exposure of the soft glass sheet to contact with a solid mold in the viewing area to minimize vision area defects.

Once the glass sheets have been bent to their conforming complicated shapes in a press bending station having an ambient temperature of approximately 1080° F. (582° C.), it is necessary that they retain their conforming shapes until cooled from the deformation temperature range of approximately 1080° F. (582° C.) to 1150° F. (621° C.) to below the strain point of the glass, which for float glass is approximately 950° F. (510° C.). To insure this conformance of both glass sheets to the desired shape, it is essential that they be cooled at a slow rate of cooling to below said strain point. The maximum rate of cooling that avoids excessive permanent warpage between the glass sheets depends upon the glass thickness. For two sheets of float glass, each 90 mils (2.3 millimeters) thick, a maximum rate of 150° F. (83° C.) per minute to a temperature of about 900° F. (482° C.) followed by uncontrolled more rapid cooling to room temperature has been found adequate to maintain pairs of glass sheets bent to complicated shapes in sufficient conformance to permit their lamination to opposite sides of an interlayer 30 mils (0.76 mm) thick to form windshields of said complicated shape. Slower cooling rates to below the strain point is desirable for avoiding excessive permanent warpage while annealing pairs of thicker, bent float glass sheets. For example, for a pair of glass sheets, each 100 mils (2.5 millimeters) thick, a maximum cooling rate of 120° F. (67° C.) per minute is advised and 90° F. (50° C.) per minute is advised for a pair of glass sheets each having a thickness of $\frac{1}{8}$ inch (3.2 millimeters).

It will be understood from the foregoing description that glass sheets of non-rectangular outline and non-uniform curvature in plan are bent to complementary shapes in pairs by first mounting a pair of glass sheets in proper alignment over an outline mold defining a preliminary longitudinal component of bend about the transverse dimension of the glass sheets, means is provided to stop and align the outline mold so that the geometric center of the glass sheets shaped to the longitudinal bend component is aligned both longitudinally and transversely with the geometric center of the upper and lower pressing molds, means in the form of pins and slots is provided to retain the pressing molds in geometric center alignment with the supported glass sheet despite any thermal expansion or contraction so that the pressing molds impart their complementary shapes to the pair of glass sheets precisely, thereby insuring that the glass sheets are shaped to complicated shapes needed for matching and aligning the complicated contour of a longitudinal component of bend of smooth curvature and a transverse component of bend of S- shaped or any other desired configuration in elevation with that of a mounting frame that receives a laminated window that results from laminating the pair of glass sheets bent simultaneously. The exact conformance of the shapes of the two sheets bent in the manner described herein facilitates the lamination of the two sheets to one another despite their complicated shapes.

While the present invention has been described in terms of shaping a pair of glass sheets simultaneously to complicated shapes, it is also within the contemplation of this invention to shape glass sheets one at a time on apparatus conforming to the present invention and chill the sheet bent to its complicated shape sufficiently rapidly to impart at least a partial temper thereto. The non-uniformity of bend and of the outline shape of the glass sheet would make it necessary to use the various alignment means of the present apparatus to insure the proper configuration of the bent glass regardless of whether the shaped glass is to be annealed and laminated or tempered and/or laminated after shaping. Furthermore, while the specific embodiment described involves apparatus that includes an outline mold in combination with upper and lower pressing molds at a press bending station, it is recognized that for bending one or more sheets of thin glass (whose individual thickness does not exceed 3 mm. (0.120 inch to less complicated shapes, the outline mold can be used with the vertically movable, lower pressing mold in the absence of an upper pressing mold. Under such circumstances, the one or more thin glass sheets are transferred from the outline mold which supports the periphery of the glass to the vertically movable mold which supports the glass throughout substantially its entire extent and changes the uncontrolled sag in the glass to a controlled configuration as it lifts the glass off the outline mold and allows the glass to conform to the upwardly facing shaping surface of the vertically movable mold by a combination of inertia and gravity sagging. Under such circumstances, the press bending station is called a shaping station when the upper pressing mold is eliminated.

While the present invention relates to the shaping of glass sheets to complicated shapes, it is understood that the proper transfer of a glass sheet from an outline mold to a vertically movable mold with minimum disruption of the alignment and orientation of the shaped glass sheets during their transfer from the outline mold to the vertically movable mold is an important feature of this invention. Another important feature is the return of said glass in proper alignment onto the outline mold after imparting its complicated shape thereon.

The form of the invention shown and described in this disclosure represents an illustrative preferred embodiment thereof. It is understood that various changes may be made without departing from the gist of the invention as defined by the claimed subject matter which follows.

We claim:

1. An apparatus for shaping a glass sheet to a predetermined shape, comprising:
   an elongated heating lehr comprising:
      a heating zone to heat the sheet to its shaping temperature; and
      a shaping station to shape the sheet;
   a carriage;
   a conveyor extending longitudinally through said lehr along a substantially horizontal longitudinal reference line from said heating zone to said shaping station for advancing said carriage from said heating zone into said shaping station along a path;
   an outline sheet supporting mold;
   means mounted on said carriage and acting on said supporting mold for longitudinally and laterally adjusting the position of said supporting mold with respect to said carriage to position a predetermined center of said supporting mold in vertical alignment with a corresponding predetermined center of said carriage;
   stop means mounting said outline sheet supporting mold for guiding the sheet into a predetermined position on said sheet supporting mold with predetermined center of the sheet coincident with the predetermined center of said outline mold;
   a lower shaping mold in said shaping station, said lower shaping mold having an upper shaping surface having a predetermined center;
   means for moving said lower shaping mold to move the predetermined center of the shaping surface upward along a fixed vertical axis from a position beneath the path to a position to lift the sheet from said sheet supporting mold; and
   mechanical alignment means mounted adjacent said conveyor and acting on said carriage for aligning and maintaining said sheet supporting mold in a predetermined horizontal orientation over said lower shaping mold with the predetermined center of said sheet supporting mold along the fixed vertical axis of said shaping surface of said lower shaping mold.

2. The shaping apparatus as set forth in claim 1 wherein said mechanical alignment means includes:
   a pair of pins;
   means for movably mounting a pin on each side of said conveyor;
   a pair of pin engaging members;
   means for mounting a pin engaging member on opposed sides of said carriage; and
   means for moving said pins toward said carriage into engagement with adjacent one of said pin engaging members to align and maintain said sheet supporting mold in the predetermined orientation.

3. The shaping apparatus as set forth in claim 2 wherein a pin engaging member comprises a long leg, a short leg and an interconnecting leg to define a J-shaped member and said pin moving means moves its respective pin between a position clear of adjacent pin engaging member, an intermediate position where said pin is clear of said shorter leg of adjacent pin engaging member but not of said longer leg to stop said carriage and a fully laterally extended position where said pin engages said interconnecting leg of adjacent pin engaging member to align and maintain said sheet supporting mold in the predetermined orientation.

4. The shaping apparatus as set forth in claim 2 wherein said lower shaping mold is a lower pressing mold and said shaping station further includes:
   an upper pressing mold having a shaping surface complementary to the shaping surface of said lower pressing mold; and
   means for vertically aligning said upper pressing mold with said lower pressing mold with their predetermined centers aligned with said fixed vertical axis.

5. The shaping apparatus as set forth in claim 1 wherein said lower shaping mold includes a support in spaced relation to said mold shaping surface, a pair of transverse slots and a pair of longitudinal slots facing said support with the intersection of a line interconnecting said transverse slots with a line interconnecting said longitudinal slots being located along said fixed vertical axis, and pins extending from said support and receivable in ones of said slots to avoid displacing the predetermined center of said mold shaping surface from said fixed vertical axis when said shaping surface and said support have different coefficients of thermal expansion or are exposed to differences in temperature during use.

6. The shaping apparatus as set forth in claim 1 wherein the sheet is a pair of glass sheets and the predetermined shape has a complicated curvature comprising a longitudinal component of bend and a transverse component of bend wherein:

said elongated heating lehr is a tunnel type bending lehr;

said outline sheet supporting mold has a nonrectangular outline defining a shape correlated with the longitudinal component of bend;

said lower shaping mold is a lower pressing mold;

an upper pressing mold having a shaping surface complementary to the shaping surface of said lower pressing mold, the shaping surface of said upper and lower molds correlated with the complicated curvature and including the transverse component of bend;

means for vertically aligning said upper pressing mold with said lower pressing mold with their predetermined centers aligned with said fixed vertical axis; and means responsive to the movement of the carriage into said shaping station (1) for actuating said mechanical alignment means to align and maintain said sheet supporting mold in the predetermined horizontal orientation; (2) for actuating said lower pressing mold moving means to (a) move the lower pressing mold upward along the fixed vertical axis to remove the sheets from said outline mold and press shape the sheets between said upper and lower pressing molds, and (b) move the lower pressing mold downward to position the shaped sheets on said outline mold and (3) for actuating said mechanical alignment means to disengage said carriage.

7. The shaping apparatus as set forth in claim 6 wherein said mechanical alignment means includes:
a pair of pins;
means for movably mounting a pin on each side of said conveyor;
a pair of pin engaging members;
means for mounting a pin engaging member on opposed sides of said carriage; and
means for moving said pins toward said carriage into engagement with adjacent one of said pin engaging members to align and maintain said sheet supporting mold in the predetermined horizontal orientation.

8. The shaping apparatus as set forth in claim 7 wherein a said pin engaging member comprises a long leg, a short leg and an interconnecting leg to define a J-shaped member and said pin moving means moves its respective pin between a position clear of adjacent pin engaging member, an intermediate position where said pin is clear of said shorter leg of adjacent pin engaging member but not of said longer leg to stop said carriage and a fully laterally extended position where said pin engages said interconnecting position of adjacent pin engaging member to align and maintain said sheet supporting mold in the predetermined horizontal orientation.

9. The shaping apparatus as set forth in claim 1 or claim 4 or claim 6 wherein said shaping station has a side door and further includes means for opening and closing said side door to permit access to said shaping station.

10. The shaping apparatus as set forth in claim 1 or claim 4 or claim 6 wherein said carriage is provided with a pair of apertured plates and said shaping station comprises a radiant energy transmitter and receiver forming an optical path that is intercepted by one or both of said apertured plates when said carriage is misoriented or misaligned at said shaping station and said optical path extending through the apertures of said apertured plates when said carriage is in the predetermined orientation.

11. An apparatus for shaping a glass sheet, comprising:
an outline mold having a predetermined center;
a carriage;
means for mounting said outline mold on said carriage to define sheet conveying means;
a shaping station;
a lower sheet shaping mold in said shaping station, said lower shaping mold having an upper shaping surface having a predetermined center;
means for moving said lower shaping mold to move the predetermined center of the shaping surface upward along a fixed vertical axis to lift the sheet from said outline mold;
means for moving said sheet conveying means into said shaping station;
means mounted on said sheet conveying means and in said shaping station for positioning and orienting said sheet conveying means relative to the shaping surface of said lower shaping mold to align said outline mold in a predetermined horizontal orientation with the predetermined center of said outline mold in said fixed vertical axis, said positioning and orienting means include:
a pair of pins;
means for movably mounting said pins spaced from one another in said shaping station;
a pair of J-shaped members each having a longer leg, a shorter leg and a connecting portion therebetween;
means for mounting one of said J-shaped members on each of opposed sides of said sheet conveying means with the connecting portion to be alignable with adjacent one of said pins when the predetermined center of said outline mold is in said fixed vertical axis; and
means responsive to said carriage moving into said shaping station (1) for actuating said movable mounting means to move the pins into engagement with adjacent J-shaped member prior to shaping the sheet to stop and thereafter to align said sheet conveying means and (2) for actuating said movable mounting means to move the pins out of engagement with said J-shaped members after the shaped sheet is positioned on said outline mold; and
means responsive to the positioning and orienting of said sheet conveying means for energizing said moving means to move said shaping mold upwardly to transfer the sheet from said outline mold to said shaping mold to shape the sheet and thereafter downwardly to position the shaped sheet on said outline mold.

12. The apparatus as set forth in claim 11 wherein the shape is a complicated shape of substantially continuous extent defining a longitudinal component of bend and a transverse component of bend with said outline mold having at least one of the components of bend and said shaping mold having the complicated shape.

13. The apparatus as set forth in claim 11 wherein said movably mounting means moves said pins between a laterally retracted position completely clear of said carriage, an intermediate position where said shorter legs are clear of said pins but said longer legs abut said pins to stop said carriage and a fully laterally extended position wherein at least one of said pins engages said connecting portion of its associated J-shaped member and at least one of said pins is adapted on its engagement with said connecting portion between said longer leg and said shorter leg to move said outline mold into position where the predetermined center of said outline mold is located at said fixed vertical axis.

14. The apparatus as set forth in claim 11 wherein said carriage is provided with a pair of apertured plates and said shaping station includes a radiant energy transmitter and receiver forming an optical path that is intercepted by one or both of said apertured plates when said carriage is misoriented or misaligned at said shaping station, said optical path extending through the apertures of said apertured plates when said carriage is oriented at said shaping station with the predetermined center of said outline mold in said fixed vertical axis.

* * * * *